United States Patent
Bos et al.

[11] Patent Number: 6,141,074
[45] Date of Patent: Oct. 31, 2000

[54] FOUR DOMAIN PIXEL FOR LIQUID CRYSTALLINE LIGHT MODULATING DEVICE

[75] Inventors: Philip J. Bos, Hudson; Hemasiri K. Vithana, Kent; David L. Johnson, Kent; Jianmin Chen, Kent, all of Ohio

[73] Assignee: Kent State University, Kent, Ohio

[21] Appl. No.: 08/993,912

[22] Filed: Dec. 18, 1997

Related U.S. Application Data

[63] Continuation of application No. 08/445,174, May 19, 1995, abandoned.

[51] Int. Cl.$^7$ .................................................. G02F 1/1337
[52] U.S. Cl. ........................................... 349/129; 349/179
[58] Field of Search ..................... 349/123, 125, 349/128, 129, 132, 134, 136, 130, 179, 186, 86

[56] References Cited

U.S. PATENT DOCUMENTS

| | | | |
|---|---|---|---|
| 4,986,638 | 1/1991 | Yamazaki et al. | 359/78 |
| 5,119,218 | 6/1992 | Yoshimoto et al. | 359/54 |
| 5,189,540 | 2/1993 | Nakamura et al. | 359/102 |
| 5,194,973 | 3/1993 | Isogai et al. | 359/53 |
| 5,249,070 | 9/1993 | Takano | 359/75 |
| 5,296,952 | 3/1994 | Takatsu et al. | 359/53 |
| 5,309,264 | 5/1994 | Lien et al. | 359/77 |
| 5,453,862 | 9/1995 | Toko et al. | 359/76 |
| 5,473,455 | 12/1995 | Koike et al. | 359/76 |
| 5,477,358 | 12/1995 | Rosenblatt et al. | 359/77 |
| 5,477,359 | 12/1995 | Okazaki | 359/77 |
| 5,479,282 | 12/1995 | Toko et al. | 359/75 |
| 5,504,604 | 4/1996 | Takatori et al. | 359/75 |
| 5,867,237 | 2/1999 | Yazaki et al. | 349/86 |
| 5,959,707 | 9/1999 | Murai et al. | 349/121 |
| 5,963,290 | 10/1999 | Murai et al. | 349/129 |

FOREIGN PATENT DOCUMENTS

| | | |
|---|---|---|
| 0451905 A1 | 10/1991 | European Pat. Off. . |
| 106624 | 11/1988 | Japan . |
| 88520 | 3/1989 | Japan . |
| 273509 | 8/1990 | Japan . |

OTHER PUBLICATIONS

"Multi-Domain Homeotropic Liquid Crystal Display for Active Matrix Application", IBM Research Division, pp. 21–24, date unknown.

(List continued on next page.)

*Primary Examiner*—Kenneth Parker
*Attorney, Agent, or Firm*—Rinner,Kenner Greive, Bobak Taylor & Weber

[57] ABSTRACT

A liquid crystalline light modulating pixel includes first and second cell wall structures and nematic liquid crystal disposed therebetween. The first and second cell wall structures cooperate with the liquid crystal to form four liquid crystal domains within the pixel. The liquid crystal in each of the domains exhibits a twisted nematic liquid crystal structure and the orientation of the liquid crystal director of the liquid crystal adjacent one of the cell wall structures in at least two domains is different.

62 Claims, 4 Drawing Sheets

OTHER PUBLICATIONS

"Amorphous Twisted Nematic–Liquid–Crystal Display Fabricated by Nonrubbing Showing Wide and Uniform Viewing Angle Characteristics Accompanying Excellent Voltage Holding Ratios", J.Appl. Phys. V. 74, N.3,Aug. 1, 1983, 2071–20.

"Two–Domain Twisted Nematic and Tilted Homeotropic Liquid Crystal Display for Active Matrix Applications", pp. 68–72, copyrighted 1991, IEEE.

"Polymer Stabilized Amorphous TN–LCD", pp. 484–487, Stanley Electric Co., Ltd; Dainippon Inc. & Chemicals, Inc.; and Faculty of Technology, Tokyo University, date unknown.

"35.6: Vertically Aligned Liquid–Crystal Display", pp. 758–761, SID 91 Digest.

"S3–3 9.4 4096 Color CSH–LCD", Stanley Electric Co., Ltd., pp. 61–64, Japan Display, dated 1992.

"JID–Crystal Orientation on SiO Films at 60° Incidence", Proceeding of the SID, vol. 25/4, 1984, pp. 287,292, authored by K Hiroshima and H. Obi.

"44.2: Analytical Simulation of Electro–Optical Performance of Amorphous and Multidomain TN–LCDs", pp. 919–922, SID 1994 Digest, Stanley Electric Co., Ltd.

"44.1: Invited Address: Electro–Optical Characteristics of Amorphous and Super–Multidomain TN–LCDs Prepared by a Non–Rubbing Method", pp. 915–918, SID 94 Digest, Tokyo Univ. ofA&T.

"Liquid Crystals—Applications and Uses", World Scientific, vol. 3, p. 44–55, 255–259, and 279–281 copyright 1992.

"Controlled High–Tilt–Angle Nematic Alignment Compatible with Glass Frit Sealing", published 1982, pp. L761–L763, Department of Electronics, Faculty of Engineering, Yamanashi University.

"New Development in Alignment Layers for Active Matrix TN–LCDs", pp. 78–85, Faculty of Technology, Tokyo University of A&T, date unknown.

"Tilted Homeotropic Alignment of Liquid–Crystal Molecules/Using the Rubbing Method",Mol. Cryst. Liq. Cryst. 1991, vol. 199, pp. 151–158, copyrighted 1991.

"35.7: Full–Cone Wide–Viewing–Angle Multilcolor CSH–LCD", Stanley Electric Co., Ltd., SID 91 Digest, pp. 762–765.

"Two–Domain 80°—Twisted Nematic Liquid Crystal Display for Grayscale Applications", Japan J. Appln. Phys. vol. 31 (1992) pp. L1603–L1605.

"The Symmetry Property of a 90° Twisted Nematic Liquid Crystal Cell", Mol. Cryst. Liq. Cryst., 1991, vol. 198, pp. 37–49.

"Three–Dimensional Simulation of Multi–Domain Homeotropic Liquid Crystal Cell", Japan J.Appl. Phys. vol. 33 (1994) pp. 6240–6244.

"7.3: Photostable Tilted–Perpendicular Alignment of Liquid Crystals for Light Valves", Hughes Research Laboratories, pp. 98–101, SID 90 Digest.

"S15–6 A Complementary TN LCD with Wide–Viewing–Angle Grayscale", NEC Corp., pp. 591–594, Japan Disp. Dated 1992.

"41.5: Late–News Paper: A Full–Color TFT–LCD with a Domain–Divided Twisted–Nematic Structure", pp. 798–801, SID 92 Digest.

"19.2: Two–Domain TN–LCDs Fabricated by Parallel Fringe Field Method", pp. 269–272, SID 93 Digest.

"44.4: Improvement of Gray–Scale Performance of Optically Compensated Birefringence (OCB) display Mode for AMLCDs", pp. 927–930, SID 94 Digest.

"An Introduction to the Methods of Optical Crystallography", pp. 116 et seq.,Bloss, dated 1992.

FOUR DOMAIN PIXEL FOR LIQUID CRYSTALLINE LIGHT MODULATING DEVICE

This application is a continuation application of U.S. application Ser. No. 08/445,174 filed May 19, 1995 abandoned.

To overcome these shortcomings of conventional twisted nematic liquid crystal displays, two major approaches have been proposed, retardation film compensated liquid crystal displays and multi-domain twisted nematic liquid crystal displays. Retardation film compensation improves the on-off electrooptical performance but does not solve the gray scale problem.

Concerning the multi-domain approach, recent analytical simulations suggest that the best viewing characteristics in gray scale active matrix liquid crystal displays are obtained in twisted nematic liquid crystal displays with four domains. Many techniques have been proposed in an attempt to develop multi-domain twisted nematic structures. Research has concentrated mostly on two domain liquid crystal displays, which suffer from a contrast inversion problem.

Many two domain tilted homeotropic displays are based on the fringe field effect. This technique requires special electrode designs and proper positioning of the domains. Because of the need for complex electrode design, optical transmission in the bright state is low in these displays.

Four domain liquid crystal displays have been fabricated using the fringe field effect and homeotropic alignment layers. These four domain liquid crystal displays suffer from the major drawback of requiring a hole in the electrode, which reduces the active area of the device. While the need for four domain twisted nematic liquid crystal displays is great, no satisfactory implementation techniques have been presented.

A liquid crystal display employing tilted homeotropic alignment based on the electrically controlled birefringence effect has high contrast near normal incidence, fast response times and satisfactory multiplexibility. For proper operation of such a display without defects it is very important to obtain a tilted structure of the molecules in the same direction. However, the required tilt angle must be very small, less than about 3°, to maintain a very dark off state and hence high contrast.

K. Hiroshima and H. Obi, SID Digest, p. 287 (1984), disclose a vacuum oblique evaporation technique that deposits layers of $SiO_x$ onto a rotating substrate to obtain pretilt angles of 0–35°. This technique rotates the substrate and does not enable a well-controlled pretilt close to homeotropic. This publication also discloses that it is possible to obtain homogeneous alignment with a pretilt of a few degrees by a rubbing process.

One widely used method to obtain tilted homeotropic alignment is two angle deposition of $SiO_x$ followed by an alcohol or organosilane treatment of the substrates. In this method the pretilt is very sensitive to the thickness of the shallow angle $SiO_x$ deposition layer. Also, pretilt angles are highly dependent on the angle of $SiO_x$ deposition in this method. This limits the size of the substrate that can be used.

In another method a homeotropic alignment agent is deposited on a unidirectionally rubbed surface. However, it is well known that the rubbing process as an alignment technique can cause problems, especially in active matrix liquid crystal display applications.

Amorphous multidomain twisted nematic displays have been fabricated by nonrubbing methods, but have more than the optimum number of four domains. Amorphous multidomain twisted nematic displays commonly use chiral additives, which cause a unidirectional twist sense of the nematic structure. Even though the amorphous multidomain twisted nematic displays have satisfactory electrooptical characteristics, reverse tilt disclinations lower their quality. A polymer stabilized amorphous multidomain twisted nematic display has been proposed to stabilize these disclinations at the expense of lower contrast.

SUMMARY OF THE INVENTION

The four domain liquid crystalline light modulating pixel of the invention overcomes the problems of the prior art and yet is fabricated by simple techniques. Four domain homogeneous liquid crystal displays fabricated in accordance with the invention do not suffer from the narrow and nonuniform viewing angle problems of typical twisted nematic displays.

Four domain tilted homeotropic liquid crystal displays of the invention also have a wide viewing angle. These displays do not suffer from the major drawback of bright disclination lines or domain boundaries on a dark background, and do not require an additional processing step in which a black matrix is necessary to subdue light scattered by the disclinations.

There are numerous liquid crystal alignment configurations or combinations thereof suitable for use in the four domain liquid crystalline light modulating pixel of the invention. A reverse rubbing treatment provides the liquid crystal molecules adjacent the substrate with homogeneous alignment. A vacuum oblique evaporation treatment provides the liquid crystal molecules adjacent the substrate with either homogeneous or homeotropic alignment.

As used herein, homogeneous alignment refers to when substantially all of the liquid crystal molecules adjacent a substrate in the homogeneously aligned region lie generally parallel to one another, and substantially parallel to the substrate. Likewise, homeotropic alignment refers to when the liquid crystal molecules adjacent the substrate are generally parallel to each other and substantially perpendicular to the substrate.

As used herein the terms homogeneous and homeotropic alignment not only include when the molecules lie exactly parallel or perpendicular to the substrate, but also when the molecules are tilted with respect to the substrate or with respect to the substrate normal, respectively, such that they have a so called pretilt angle. Depending on the manner of aligning the liquid crystal, the molecules may have a very slight pretilt angle inherently produced by the alignment procedure, or the method and materials may be selected to intentionally provide a desired pretilt angle.

The liquid crystalline light modulating pixel of the invention includes first and second cell wall structures and nematic liquid crystal disposed therebetween. The first and second cell wall structures cooperate with the liquid crystal to form four liquid crystal domains within the pixel. The liquid crystal in each of the domains exhibits a twisted nematic liquid crystal structure.

The orientation of the liquid crystal director of the liquid crystal adjacent the cell wall structures may be configured to produce the desired four domains, depending upon masking pattern variations in the treatment. For example, the orientation of the liquid crystal director of the liquid crystal adjacent one of the cell wall structures in at least two domains may be different; the orientation of the liquid crystal director of the liquid crystal adjacent each of the cell wall structures in at least two domains may be different; or the orientation of the liquid crystal director of the liquid crystal in all four domains adjacent one of the cell wall structures may be different.

If liquid crystal having positive dielectric anisotropy is used, the liquid crystal adjacent the cell wall structures is tilted with respect thereto from 0.5°–30°. Alternatively, if liquid crystal having negative dielectric anisotropy is used, the liquid crystal adjacent the cell wall structures is tilted with respect to a normal to said cell wall structures from 0.1°–10°.

Preferably, the liquid crystal director in two domains has right hand rotation and the liquid crystal director in the remaining domains has left hand rotation. The liquid crystal director of the liquid crystal in two adjacent domains adjacent one of the cell wall structures is oriented 180° with respect to the liquid crystal director in the remaining two domains adjacent that cell wall structure.

At a middle plane of the pixel substantially midway between and parallel to the first and second cell wall structures the liquid crystal director in each domain is oriented orthogonal to the liquid crystal director in the two adjacent domains. To obtain the desired orientations, each of the cell wall structures includes a rubbed polyimide layer or layers of vacuum oblique evaporated material.

A liquid crystalline light modulating device constructed in accordance with the invention includes first and second cell wall structures with nematic liquid crystal disposed therebetween and means for electrically addressing the liquid crystal. The device has at least one liquid crystalline light modulating pixel that includes four liquid crystal domains within the pixel formed by cooperation of the first and second cell wall structures with the liquid crystal. The liquid crystal in each of the domains exhibits a twisted nematic liquid crystal structure. The orientation of the liquid crystal director of the liquid crystal adjacent one of the cell wall structures in at least two domains is different. Other variations of the liquid crystal director orientation are possible, depending upon masking pattern variations in the treatment, and will result in a four domain pixel, as discussed above.

The light modulating device also includes two polarizers between which the cell wall structures are located. The polarization orientation passed by one polarizer is either parallel to (parallel polarizers) or orthogonal to (crossed polarizers) the polarization orientation passed by the other polarizer.

In its broad aspects, the method of producing a four domain liquid crystalline pixel for a light modulating device in accordance with the invention includes the steps of providing first and second cell wall structures. At least a first region on a cell wall structure is treated to provide the liquid crystal director of the liquid crystal adjacent the first region of the cell wall structure with an orientation in a first direction. At least a second region on a cell wall structure is treated to provide the liquid crystal director of the liquid crystal adjacent the second region of the cell wall structure with an orientation in a second direction different than the first orientation direction. The cell wall structures are spaced apart and a nematic liquid crystal is provided between the first and second cell wall structures.

The treatment of the first and second regions, when properly oriented on opposing cell wall structures, produces four domains in which the liquid crystal has a twisted nematic liquid crystal structure and the orientation of the liquid crystal director of the liquid crystal adjacent one of the cell wall structures in at least two domains is different. The treatment may be varied to produce the other orientations of the liquid crystal director discussed above.

One preferred treatment of the first and second cell wall structures includes forming a layer of material on the cell wall structures. The layer is rubbed in one direction. A mask is formed on the layer of material to form an uncovered portion and a covered portion corresponding to the first and second regions. The first and second regions extend throughout the entire substrate and preferably the entire light modulating portion of a light modulating device. The masked layer is then rubbed in a different direction, and the mask is removed to provide first and second regions rubbed in different directions. The rubbing direction of the first region is preferably opposite to the rubbing direction of the second region. The cell is assembled by spacing apart the cell wall structures and orienting them such that the rubbing directions on the first cell wall structure are orthogonal to the rubbing directions on the second cell wall structure. Nematic liquid crystal is filled between the cell wall structures.

Another treatment of the first and second cell wall structures includes forming a first layer of material on the cell wall structures by vacuum oblique evaporation. A mask is formed on the first layer of material to form an uncovered portion and a covered portion corresponding to the first and second regions. The cell wall structures are rotated preferably 180° and a second layer of material is formed on them by vacuum oblique evaporation. The mask is then removed.

The cell is then fabricated by spacing apart the cell wall structures and orienting them such that the evaporation directions of material on the first cell wall structure are orthogonal to the evaporation directions of material on the second cell wall structure. Nematic liquid crystal is then filled between the cell wall structures.

In another embodiment, the fabrication method for producing a tilted homeotropic four domain display includes the steps of depositing a first layer of silicon monoxide onto a rotating substrate by vacuum oblique evaporation. The rotation of the substrate is stopped opposite to the desired pretilt direction and a second layer of material is deposited on the substrate by vacuum oblique evaporation for a short period of time.

After the second evaporation the substrate is masked in an alternating striped pattern comprising first and second regions. Each stripe of the mask is equal to about one half of the pixel size, i.e., the width of one of the first and second regions. The substrate is rotated by 180° and a third layer of evaporated material is deposited on the fixed substrate for a short period of time. This provides liquid crystal molecules adjacent the substrate surface with tilted homeotropic alignment with the tilt being in opposite directions in the first and second regions.

Existing methods for obtaining tilted homeotropic alignment require more than one step and are lengthy procedures. In all these methods it is not possible to control the pretilt angle below 4° very well which is important in obtaining displays having very high contrast. The primary conventional method requires a final step of alcohol or organosilane treatment of the substrate. Compared to these methods, the method of the invention is much simpler and requires only the inorganic silicon monoxide, which is very stable under many conditions and provides better control over the pretilt angle.

An advantage is that the deposition angle can be varied in the range of 20–70° with no difference in the final result. Thus, this method provides greater flexibility in preparing larger substrates compared to other $SiO_x$ evaporation methods.

Another advantage of the tilted homeotropic display technique of the present invention is that it does not require special electrode designs containing holes in the pixel electrode, as do some current multi-domain displays. These current designs require several high resolution photolithography steps. With the technique of the present invention it is much simpler to construct four domain displays and because of lack of an electrode hole, they have a greater active area.

The four domain tilted homeotropic displays of the invention have much better electrooptical characteristics than conventional twisted nematic liquid crystal displays. Compared to conventional twisted nematic liquid crystal displays, the tilted homeotropic four domain displays of the invention have much more symmetric viewing angle distribution, good gray scale capability and very high contrast.

In homogeneously aligned four domain displays, disclination lines due to the reverse twist attributable to the low pretilt angle are a problem. Hence, the domain boundaries are not always stable. In the four domain tilted homeotropic display of the invention, disclinations or defect lines due to reverse twist are not present and domain boundaries are well defined and very stable at any voltage applied across the display.

A further advantage of the present method for fabricating a tilted homeotropic four domain cell is that rubbing is not required, which avoids surface contamination and build-up of electrostatic charges. Thus, the tilted homeotropic displays of the invention are especially suitable for use as active matrix liquid crystal displays.

DETAILED DESCRIPTION OF THE PREFERRED EMBODIMENTS

Figure 1:
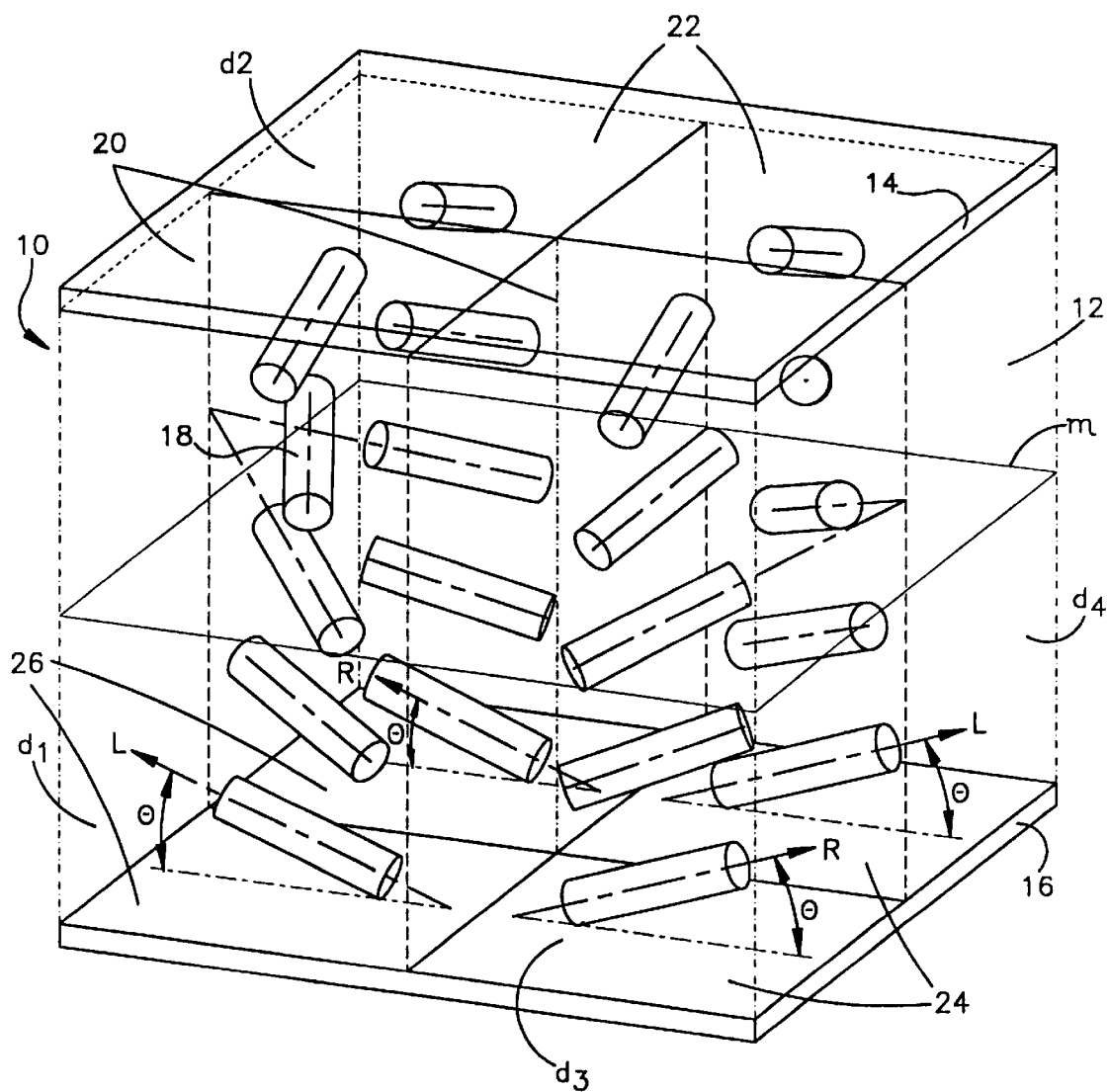
FIG. 1 is a perspective view of a four domain homogeneous pixel constructed in accordance with the invention, with the cylindrical members representing liquid crystal molecules and the arrows representing their pretilt direction.

Turning now to the drawings and to FIG. 1 in particular, a liquid crystalline pixel for a light modulating device is shown generally at 10. The pixel 10 comprises a liquid crystalline material 12 disposed between first and second cell wall structures or substrates 14, 16 including a nematic liquid crystal. Only a portion of the first and second substrates 14, 16 corresponding to one pixel is shown in FIG. 1. Four domains $d_1$–$d_4$ extend between the first and second cell wall structures 14, 16 in which the liquid crystal 12 has a twisted nematic liquid crystal structure. FIG. 1 shows the twisted nematic structure of the liquid crystal molecules 18 of positive nematic liquid crystal in the field-off state. The liquid crystal director of each of the liquid crystal molecules 18 extends substantially along the long axis of the molecules 18. The liquid crystal director of the liquid crystal adjacent the substrates 14, 16 preferably is tilted with respect to the substrates at an angle θ, which is commonly referred to as a pretilt angle.

The orientation of the liquid crystal director is determined by the treatment technique, and is the direction in which the tilted director points, as shown in FIG. 1 by arrows. The arrowheads depict the end of the director that is at a pretilt angle θ. The liquid crystal molecules 18 adjacent the substrates 14, 16, either touch the substrates or are near them. As used herein, reference to the surface liquid crystal molecules as being oriented in a particular direction means a direction from the portion of the molecules nearest the substrate toward the portion of the liquid crystal molecules at the pretilt angle and further from the substrate.

When the liquid crystal has positive dielectric anisotropy, homogeneous liquid crystal alignment is employed in each domain, as shown in FIG. 1. The liquid crystal molecules 18 adjacent the cell wall structures 14, 16 are tilted at angle θ with respect thereto from 0.5°–30°. When the liquid crystal has negative dielectric anisotropy, homeotropic liquid crystal alignment is employed in each domain, as shown in FIG. 7. The liquid crystal molecules adjacent the cell wall structures are tilted at an angle θ of 0.1°–10° with respect to the normal thereto.

The orientation of the liquid crystal director of the liquid crystal molecules 18 adjacent the substrates 14, 16 may be configured to produce a four domain structure in various ways. The orientation of the liquid crystal director of the liquid crystal molecules 18 adjacent one of the cell wall structures 14, 16 in at least two of the domains $d_1$–$d_4$ will be different, or the orientation of the liquid crystal director in all four domains $d_1$–$d_4$ adjacent one of the cell wall structures 14, 16 will be different.

However, in the preferred embodiment shown in FIG. 1, the orientation of the liquid crystal director of the liquid crystal molecules 18 adjacent the cell wall structure 14 in two domains $d_1$ and $d_3$, is different than in the remaining two domains $d_2$ and $d_4$. Similarly, the orientation of the liquid crystal director of the liquid crystal molecules 18 adjacent the cell wall structure 16 in two domains $d_1$ and $d_2$, is different than in the remaining two domains $d_3$ and $d_4$. The orientation of the liquid crystal director in each of the domains $d_1$–$d_4$ adjacent the cell wall structures 14, 16 is homogeneous.

The liquid crystal molecules 18 adjacent the substrate 14 in the domain $d_1$ are in the same or a parallel plane as the liquid crystal molecules 18 adjacent the substrate 14 in the domain $d_2$. However, the liquid crystal molecules 18 adjacent the substrate 14 in the domain $d_1$ are rotated 180° about the cell wall normal, ie., opposite to, the liquid crystal molecules 18 adjacent the substrate 14 in the domain $d_2$. This same relationship exists for the liquid crystal molecules 18 adjacent the substrate 14 in the domains $d_3$ and $d_4$, and for the liquid crystal molecules 18 adjacent the substrate 16.

Thus, the orientation of the liquid crystal director of the liquid crystal molecules 18 adjacent each of the cell wall structures 14, 16 in at least two of the domains is different. The pretilt angle θ in all four domains $d_1$–$d_4$ is approximately the same. However, the invention contemplates having different pretilt angles in different domains.

The twist of the liquid crystal director 18 in the domains $d_2,d_3$ is right-handed (R) and the twist of the liquid crystal director 18 in the domains $d_1,d_4$ is left-handed (L). It is known that chiral additives tend to produce a uniform twist sense in the twisted nematic structure. The liquid crystal of the invention does not have any chiral additive and it is not necessary for the desired effect. An advantage of the device of the invention is that the invention utilizes an alignment method that is simpler than that required to produce the same twist.

Figure 2A:
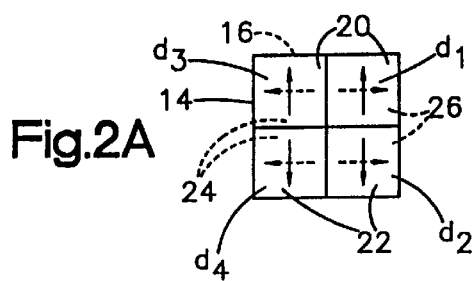
FIGS. 2A and 2C are diagrammatic views showing two typical ways to assemble four domain pixels constructed in accordance with the invention, with the dashed and solid arrows representing the rubbing directions on the bottom and top substrates, respectively.

FIG. 2A shows the treatment of the pixel of FIG. 1, wherein a first region 20 on the cell wall structure 14 is treated to orient the liquid crystal molecules 18 adjacent the wall structure 14 in one direction, and a second region 22 on the cell wall structure 14 is treated to orient the liquid crystal molecules 18 adjacent the wall structure 14 in another direction. The lower cell wall structure 16 is similarly treated to have the liquid crystal molecules 18 adjacent thereto oriented in directions 24, 26.

Figure 2B:
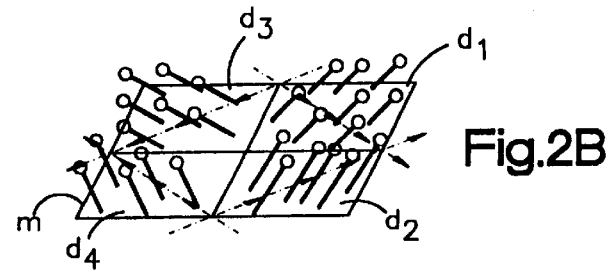
FIGS. 2B and 2D are diagrammatic views showing the liquid crystal director configurations at a middle plane m of the pixels of FIGS. 2A and 2C, respectively, with the dashed arrows indicating the orientation directions of the liquid crystal molecules in the middle plane m.
Figure 2C:
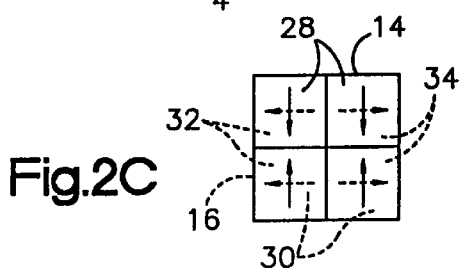

FIGS. 2A and 2C show two typical ways to assemble the cell. As seen in FIG. 2A, on each of the substrates 14, 16 the first regions 20, 24 are rubbed in a direction opposite to the direction of the second regions 22, 26.

In FIG. 2C the substrate 14 has a first region 28 rubbed in one direction and a second region 30 rubbed in the opposite direction, towards the first region 28. The other substrate 16 has a first region 32 rubbed in one direction, and a second region 34 rubbed in the opposite direction.

As shown in FIGS. 1 and 2B,D, at a middle plane m of the pixel substantially midway between and parallel to the first and second cell wall structures 14,16, the liquid crystal molecules 18 in any given domain (e.g., $d_3$) are oriented in a direction that is orthogonal to the direction in which the liquid crystal molecules 18 in two domains (e.g., $d_4,d_1$) is oriented.

In one embodiment of the invention a method of producing a liquid crystalline pixel 10 for a light modulating device comprises the steps of providing first and second cell wall structures 14, 16. As shown in FIGS. 1 and 2A, first regions 20, 24 on the cell wall structures 14, 16 are treated to orient the liquid crystal director of the liquid crystal molecules 18 adjacent the first regions 20, 24 in one direction. The second regions 22, 26 on the cell wall structures 14, 16 are treated to orient the liquid crystal director of the liquid crystal molecules 18 adjacent the second regions 22, 26 in an opposite direction than the first regions 20, 24. A nematic liquid crystal is provided between the first and second cell wall structures 14, 16.

The treatment of the first and second regions produces four domains $d_1$–$d_4$ in which the liquid crystal molecules 18 have a twisted nematic liquid crystal structure when the cell wall structures 14, 16 are properly oriented. As seen in FIG. 1, the orientation of the liquid crystal director of the liquid crystal 18 adjacent one of the cell wall structures, e.g., cell wall structure 16, in at least two domains $d_1,d_3$ is different.

In this embodiment, the treatment of the first and second cell wall structures 14, 16 comprises a preferred reverse rubbing technique (FIG. 2a) or a vacuum oblique evaporation technique. In the reverse rubbing technique the treatment includes forming a layer of polymer material, preferably polyimide, on the first substrate 14. The layer is rubbed in a first direction. A mask is formed on the first layer to cover one of the first and second regions 20, 22 and leave the other uncovered. The first and second regions 20, 22 of the substrate 14 are now rubbed in the opposite direction to the first rub. The mask is then removed, resulting in rectangular stripes comprising the first region 20 and the second region 22. The second substrate 16 is prepared in the same manner.

In the vacuum oblique evaporation technique of this embodiment, the treatment includes forming a first layer of $SiO_x$ on the first substrate 14 at an evaporation angle of preferably 85° from the normal to the substrate 14. A mask is formed on the first layer to cover one of the first and second regions 20, 22 and leave the other uncovered. The substrate 14 is rotated 180° and a second vacuum oblique evaporation at preferably 85° from the normal to the substrate 14 deposits $SiO_x$ on the first and second regions 20, 22 in the opposite direction. The mask is then removed, resulting in rectangular stripes corresponding to the first region 20 and the second region 22. The second substrate 16 is prepared in the same manner.

In both the reverse rubbing and the vacuum oblique evaporation methods of the invention, the treatment of the first region 20 orients the liquid crystal director of the liquid crystal molecules 18 adjacent the substrate 14 in one pretilt direction. The treatment of the second region 22 orients the liquid crystal director of the liquid crystal molecules adjacent the substrate 14 in a second pretilt direction opposite to the first direction. This provides the surface liquid crystal molecules 18 in the region 20 with an opposite rotational sense than the surface liquid crystal molecules 18 in the region 22. The first cell wall structure 14 is spaced apart from the second cell wall structure 16 and oriented such that the orientation direction of a given domain (eg.$d_2$), on the first substrate 14 is orthogonal to the orientation direction on the second substrate 16 in that domain.

In another vacuum oblique evaporation embodiment of the invention, a method for fabricating a tilted homeotropic four domain display includes the steps of depositing a thin layer (300–500 Angstroms) of silicon monoxide ($SiO_x$) onto a substrate 14 rotating at a given rpm (eg., 21 rpm) by vacuum oblique evaporation. The surface topography of the layer is isotropic in the plane of the substrate due to the symmetry of the deposition. The rotation of the substrate 14 is stopped opposite to the desired pretilt direction and a second evaporation is given for a short period of time. This adds a small anisotropy to the surface topography and the liquid crystal molecules will tilt in that direction. By changing the thickness of the second layer it is possible to vary the pretilt angle from 0 to about 15°. It is also possible to obtain similar results by interchanging these two steps, i.e., first evaporating on a fixed substrate, then evaporating on a rotating substrate.

After the second evaporation the substrate 14 is masked in an alternating striped pattern. The width of each stripe of the mask is equal to about one half of the pixel width. The striped mask leaves one of the first and second regions 20, 22 covered and the other uncovered. The substrate 14 is rotated by 180° and maintained in a fixed position, and a third layer of evaporated material is deposited on it for a short period of time. This provides liquid crystal molecules adjacent the substrate 14 with tilted homeotropic alignment with the tilt being in opposite directions in the first and second regions 20, 22. The second cell wall structure 16 is treated in the same manner and spaced apart from the first cell wall structure 14. The first and second cell wall structures 14, 16 are oriented such that the liquid crystal orientation direction in a given domain on the cell wall structure 16 is orthogonal to the liquid crystal orientation direction on the first cell wall structure 14 in that domain.

It will be appreciated by those skilled in the art that the invention contemplates conducting the reverse rubbing and vacuum oblique evaporation treatments in different patterns. For example, instead of using alternating, parallel rectangular stripes in the photolithography process, the substrates may be masked in a checkerboard fashion or the like. To obtain the checkerboard orientation, the treatments are carried out in a manner similar to that described, except the masking is performed diagonally with respect to adjacent domains. Thus, in a four domain cell in the two regions that are diagonal to each other the liquid crystal is oriented in the same direction. This direction is preferably opposite to that of the other two diagonal domains in the cell.

Combinations of the reverse rubbing process and the vacuum oblique evaporation process are contemplated by the invention. For example, both processes may be performed on the same substrate. Alternatively, cells may be constructed wherein the top substrate is treated by the vacuum oblique evaporation technique and the bottom substrate is treated by the reverse rubbing technique.

Suitable positive nematic liquid crystals include, for example, E7 and ZLI 4792 manufactured by EM Industries. Suitable negative nematic liquid crystals include, for example, ZLI 4330 and ZLI 2830, also available from EM Industries. Other nematic liquid crystals and liquid crystal mixtures suitable for use in the invention would be known to those of ordinary skill in the art in view of the instant disclosure.

Suitable materials for the alignment layer used in the reverse rubbing treatment would be known to those of ordinary skill in the art in view of this disclosure and include, for example, polyimide. If the reverse rubbing technique is used to fabricate the four domain twisted nematic liquid crystal displays, two key factors should be considered to select the suitable material, pretilt angle and compatibility to the photolithography process. Of the many polyimide materials that have been tested, the best results are obtained using polyimide commonly available from Nissan, which has the designation PI7311. This material has a pretilt angle of about 8° using the liquid crystal E7. Alignment is still good even with a subpixel size of 24×24 $\mu m^2$. A pretilt angle of 8° to about 9° is not large enough to stabilize the four domain structure at the zero voltage state. It is also desirable to select polyimide with low baking temperatures, and then to bake it at high temperature. It has been found that this reduces defects following the second rub.

The four domain structure in some cases is unstable at 0 volts. For the liquid crystal E7, however, the structure is typically stable at voltages larger than 1 volt. Using the liquid crystal ZLI4792 instead of E7, the instability voltage is about 1.6 volts. This may be because the liquid crystal pretilt angle is lower if lower Δn liquid crystal material is used. One way to solve this problem is to find a polyimide material that can produce a larger pretilt angle. Alternatively, a polymer network may be used to stabilize the four domain structure using the technique described in *A Low Threshold Voltage Polymer Network TN Device,* SID Digest of Technical Papers XXIV, p. 887 (1993), to effectively increase the pretilt angle in a twisted nematic device. For a more detailed discussion of the type of polyimide to use for a particular liquid crystal pretilt angle and the effect of rubbing on the orientation of liquid crystals adjacent the cell wall structures, see S. Kobayashi et al., *New Development in Alignment Layers for Active Matrix TN-LCD's,* IDRC Digest, p. 78 (1994), which is incorporated herein by reference in its entirety.

The means for electrically addressing the liquid crystal may include patterned ITO electrodes on the glass substrates, active matrices such as thin film transistors (TFT) and metal-insulator-metal type devices (MIM), and passive matrices. Other addressing means suitable for use in the invention would be known to those of ordinary skill in the art in view of the instant disclosure.

For a further discussion of the effect of polyimide on liquid crystal director alignment and the mechanisms of rubbing and $SiO_x$-obliquely evaporated surfaces in liquid crystal devices, see *LIQUID CRYSTALS Applications and Uses,* B. Bahadur Ed., World Scientific, Vol. 3, pp. 45–55, 255–259 and 278–281 (1992), which is incorporated herein by reference in its entirety.

A better understanding of the features of the invention will be had from the following, nonlimiting examples.

EXAMPLE 1

When fabricating a four domain twisted nematic liquid crystal display cell by the reverse rubbing process of the invention, an indium tin oxide (ITO) coated glass substrate was obtained from the Donnoly Corp. using their standard process. This clean, ITO coated substrate was spin coated at 3500 rpm for 30 seconds with a polyimide alignment material (Nissan PI-7311) to provide a polyimide layer of about 550 angstroms thick. The plate was then soft baked at 100° C. for one minute to evaporate the solvent, and then hard baked at 275° C. for two hours to cure the polyimide.

The substrate polymer that will cover the entire light modulating portion of a light modulating display was rubbed uniformly in a first direction. This oriented the liquid crystal director of the liquid crystal molecules adjacent the substrate in a first direction.

A photolithography process was then carried out to form a mask consisting of parallel stripes on the substrate. The photoresist material, Shipley S1400-31, was spin coated on the polyimide surface at 3500 rpm for 25 seconds to deposit photoresist at a thickness of about 1.8 $\mu m$. This was then baked at a hot plate for one minute at 100° C.

Then, an equal striped UV mask (opaque and transparent to ultraviolet light) was used. The coated substrate was exposed to ultraviolet light passing through the UV mask at a power density of 3 $mW/cm^2$ for 1 minute, using the machine NuArc 26-1k, to cause one of the first and second regions to be exposed and the other of the regions not to be exposed. The developer, Shipley MF312-CD27, was used to wash away alternating stripes. The substrate was then washed with deionized water for 15 seconds, blown with a nitrogen gun and baked on a hot plate at 100° C. for 1 minute.

After the photolithography process, the masked substrate was subjected to the reverse rubbing process in which the covered and uncovered first and second regions were rubbed uniformly in a second direction opposite to, i.e., 180° from, the first buffing direction. This second rubbing oriented the liquid crystal director of the liquid crystal molecules adjacent the substrate in the uncovered one of the first and second regions in the second direction.

The photoresist mask was then removed with acetone and water to expose the regions rubbed in the first direction. A second substrate was treated in the same manner. The buffer conditions for the first and second rubbing were a plate moving speed of 3.5 ft/min, a drum rotation speed of 550 rpm, a pile length of 1 mm. The process was repeated 2 to 4 times.

A four domain pixel was obtained by spacing apart the substrates and crossing them so that the rubbing directions of the first substrate were orthogonal to the rubbing directions of the second substrate. The cell was then assembled in the usual manner and filled with nematic liquid crystal E7 which assumed a four domain twisted nematic structure between the substrates. The cell had a thickness of about 6 $\mu$m, glass fiber spacers between the substrates and patterned ITO electrodes. The cell And satisfied Gooch-Tarry's first minimum condition with an appropriate voltage applied. Each subpixel or domain was approximately $\frac{1}{32} \times \frac{1}{32}$ inch$^2$.

EXAMPLE 2

When fabricating a four domain twisted nematic liquid crystal cell by the $SiO_x$ vacuum oblique evaporation process of the invention, an indium tin oxide (ITO) coated glass substrate was obtained by the Donnoly Corp., using their standard process. Onto this clean, ITO coated substrate a first layer of $SiO_x$ having a thickness of about 150 angstroms was formed by vacuum oblique evaporation at a first vacuum oblique evaporation angle of 85° from the plate normal and an evaporation rate of about 10 angstroms/minute. During the evaporation process, the vacuum in the evaporation chamber was kept at a pressure of $10^{-6}$ Torr. Evaporation at the first evaporation angle oriented the liquid crystal director of the liquid crystal molecules adjacent the substrate in a first direction.

A photolithography process was then carried out to form a mask consisting of parallel stripes on the $SiO_x$ layer deposited on the substrate. The photoresist material, Shipley S1400-31, was spin coated on the $SiO_x$ surface at 3500 rpm for 25 seconds to deposit the photoresist at a thickness of about 1.8 $\mu$m. The photoresist was then baked at a hot plate at 100° C. for one minute.

Then, an equal striped UV mask (opaque and transparent to ultraviolet light) was used. The coated substrate was exposed to ultraviolet light passing through the UV mask at a power density of 3 mW/cm$^2$ for 1 minute, using the machine NuArc 26-1k, to cause one of the first and second regions to be exposed and the other of the regions not to be exposed. The stripe direction was in the evaporation plane, which contained the substrate normal and the evaporation direction. The developer, Shipley MF312-CD27, was used to wash away alternating stripes. The substrate was then washed with deionized water for 15 seconds, blown with a nitrogen gun and baked on a hot plate at 100° C. for 1 minute.

After the photolithography process, the masked substrate was rotated 180° and subjected to vacuum oblique evaporation in a second direction to deposit a layer of $SiO_x$ on the substrate at a second evaporation angle of 85° from the plate normal and an evaporation rate of about 10 angstroms/minute to form a 150 angstrom thick $SiO_x$ layer. During the second evaporation, the vacuum in the evaporation chamber was kept at a pressure of $10^{-6}$ Torr. This second vacuum oblique evaporation oriented the liquid crystal director of the liquid crystal molecules adjacent the substrate in the uncovered one of the first and second regions in the second evaporation direction. The photoresist mask was then removed with acetone and water to expose the covered one of the first and second regions. A second substrate was treated in the same manner.

A four domain pixel was obtained by spacing apart the substrates and crossing them so that the evaporation direction of $SiO_x$ on the first substrate was orthogonal to the evaporation direction of $SiO_x$ on the second substrate. The cell was then assembled in the usual manner and filled with nematic liquid crystal E7 which assumed a four domain twisted nematic structure between the substrates. The cell had a thickness of about 6 $\mu$m, glass fiber spacers between the substrates and patterned ITO electrodes. The cell And satisfied Gooch-Tarry's first minimum condition with an appropriate voltage applied. Each subpixel or domain was approximately $\frac{1}{32} \times \frac{1}{32}$ inch$^2$.

EXAMPLE 3

In fabricating a four domain tilted homeotropic cell using vacuum oblique evaporation, an indium tin oxide (ITO) coated glass substrate was obtained by the Donnoly Corp., using their standard process. Onto this clean, ITO coated substrate rotating at 23 rpm a thin layer of $SiO_x$ (150–600 angstroms) was deposited by vacuum oblique evaporation at an evaporation angle of 50°. An evaluation of the surface topography of the $SiO_x$ surface by atomic force microscopy revealed a needle-like structure coming out perpendicular to the substrate. The surface features were isotropic in the plane of the substrate, which produced homeotropic alignment with zero tilt.

The rotation of the substrate was stopped at any direction and a second evaporation for 3 seconds added an $SiO_x$ layer of about 20 angstroms thick to the substrate. This provided a small anisotropy to the needle-like structure. On this surface liquid crystal molecules tilted towards the opposite direction (in the plane of evaporation) of this second evaporation.

A photolithography process was then carried out to form a mask consisting of parallel stripes on the $SiO_x$ layer deposited on the substrate. The photoresist material, Shipley S1400-31, was spin coated on the $SiO_x$ surface at 3500 rpm for 25 seconds to deposit the photoresist at a thickness of about 1.8 $\mu$m. The photoresist was then baked at a hot plate at 100° C. for one minute.

Then, an equal striped UV mask (opaque and transparent to ultraviolet light) was used. The coated substrate was exposed to ultraviolet light passing through the UV mask at a power density of 3 mW/cm$^2$ for 1 minute, using the machine NuArc 26-1k, to cause one of the first and second regions to be exposed and the other of the regions not to be exposed. The stripe direction was in the evaporation plane, which contained the substrate normal and the evaporation direction. The developer, Shipley MF312-CD27, was used to wash away alternating stripes. The substrate was then washed with deionized water for 15 seconds, blown with a nitrogen gun and baked on a hot plate at 100° C. for 1 minute.

After the photolithography process, the masked substrate was rotated by 180° and maintained in a fixed position, and a third layer of evaporated $SiO_x$ was deposited on it for 4 seconds at a 50° deposition angle. This formed a 130 angstrom thick layer of $SiO_x$ on the substrate. This provided the liquid crystal director of the liquid crystal molecules adjacent each substrate in the uncovered region with tilted homeotropic alignment. The tilt was in opposite directions, ie., away from each other, in the first and second regions. A second substrate was prepared in the same manner.

The substrates were then spaced apart and filled with the liquid crystal mixture of 5% by weight ZLI 4330 and 43% by weight ZLI 2806. The liquid crystal had negative dielectric anisotropy and was obtained from Merck. The cell had a thickness of 5 $\mu$m, glass fiber spacers, and patterned ITO electrodes. The subpixel width was 24×24 $\mu$m$^2$. The cell Δnd satisfied Gooch-Tarry's first minimum condition with an appropriate voltage applied.

EXPERIMENTAL RESULTS

By analyzing the molecular configurations in each domain, it can be seen that the liquid crystal device made by the reverse rubbing process of the invention has four domains. FIGS. 2A,C show two left hand and two right hand domains. As shown in FIGS. 1 and 2A with respect to each of the two identical handedness domains, eg., domains $d_2$, $d_3$, the liquid crystal molecules 18 adjacent the substrate 16 in the domain $d_2$ are oriented opposite to the liquid crystal molecules 18 adjacent the substrate 16 in the domain $d_3$. The liquid crystal molecular configurations at the middle plane m of each domain points to each of four quadrants. For example, as shown in FIGS. 1 and 2B, starting at domain $d_3$ and moving to domain $d_1$ clockwise around the pixel 10, the liquid crystal director of the liquid crystal molecules 18 at the midplane m of each domain are 45°, 135°, 225° and 315°.

Figure 3:
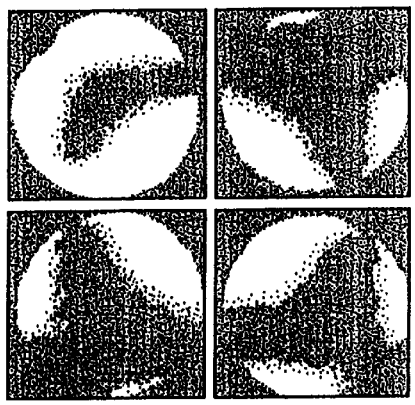
FIG. 3 is a representative drawing showing a conoscope image of a four domain homogeneous twisted nematic pixel constructed in accordance with the invention.

A four domain structure, obtained by the homogeneous rubbing technique, was confirmed by the conoscope image shown in FIG. 3 taken at 5 volts. However, suitable conoscope images could be obtained at 2–5 V. The principles of microscopy that confirm the four domain structure are provided in F. Donald Bloss, *An Introduction to the Methods of Optical Crystallography*, p. 116, et seq., (1961). At high voltage, eg., approximately 20 volts, each of the four domains had nearly the same conoscope figure. At this voltage the liquid crystal in the cell was homeotropically aligned. Thus, the conoscope figures obtained at that high voltage (not shown) resembled those of materials having a centered optic axis, in which the location of the melatope was at the cross hair intersection and the bars of the uniaxial cross were bisected by the cross hairs. However, because of the twisted nematic structure in which the director is tilted in the center of the cell, the conoscope figures at this voltage had some asymmetry.

Figure 2D:
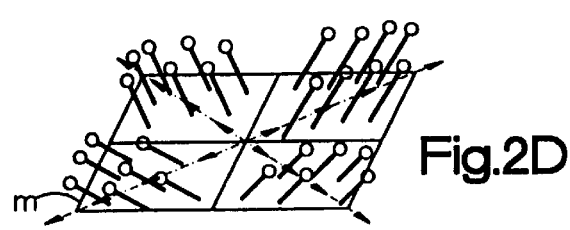

When the voltage was removed or lowered to a level between the saturated full-off or full-on states of the device, the cross pattern at each domain moved away in a different direction that matched the directions shown by the dashed arrows in FIGS. 2B and 2D. The center of the cross moved into four distinct quadrants. This is because with the field lowered the cell returned to its pretilt alignment. When the optic axis tilted into a particular domain, the center of the cross tilted into that quadrant.

In the cells of the invention, although the distinctness of the crosses was lost due to the twisted nematic structure, FIG. 3 clearly shows that the cross-like conoscopic figures haveetipped into each of four quadrants, ie., four different directions. This confirms that each of the domains was distinct and that a cell having a four domain pixel structure was obtained.

Microscopy pictures of a test cell prepared by double $SiO_x$ vacuum oblique evaporation under the normal white and black mode at zero voltage showed disclination lines at the boundary of each domain. When voltage was applied to the cell, the contrast of each domain alternately changed when viewing the cell at a fixed polar angle and varying the azimuthal angle. Because the molecular configuration was different in the different domains, the domains mutually compensated each other optically and produced a wide viewing angle.

Figure 4:
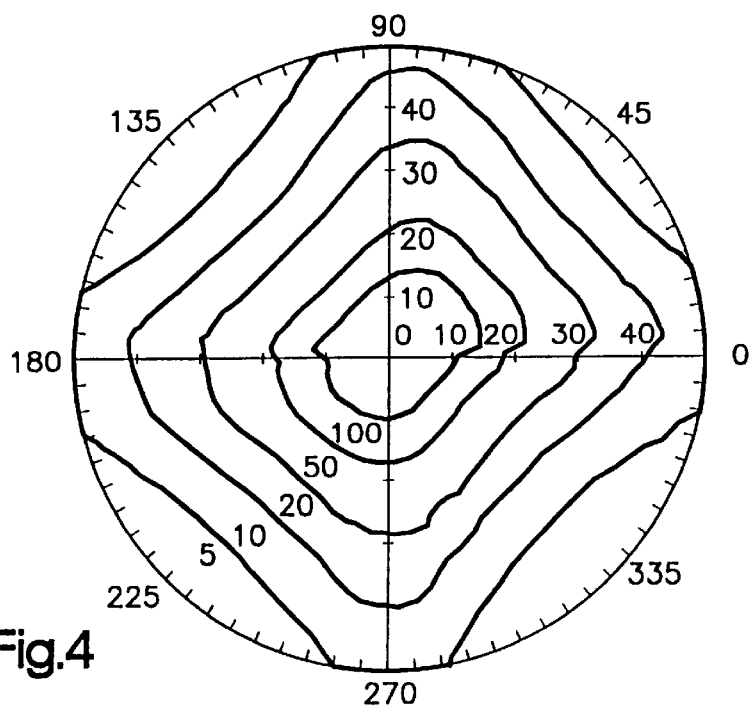
FIG. 4 is a representative drawing showing the viewing angle characteristics of a four domain homogeneous twisted nematic cell constructed in accordance with the invention.
Figure 5:
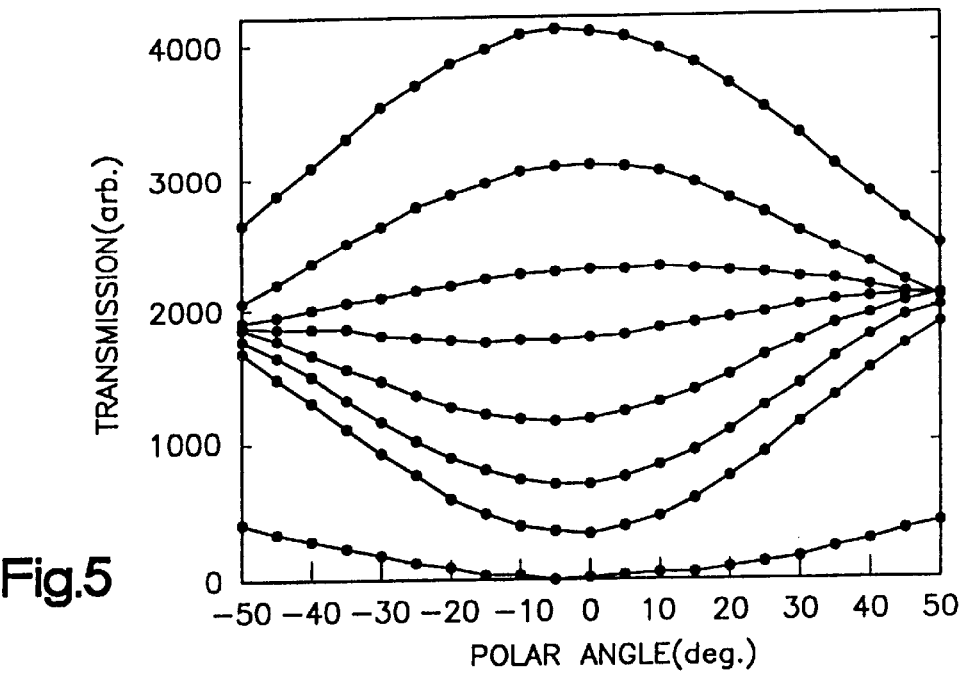
FIG. 5 is a representative graph of a homogeneous four domain cell, showing the polar angle dependence of the transmission of 8 gray scales.

FIG. 4 shows the primary iso-contrast measurement under the normal white mode with 6 volts applied in the on-state. The polar angle dependence of transmission in eight gray levels of a four domain homogeneous test cell is shown in FIG. 5. The measurement results show no gray scale inversion within ±50° at any direction. These experimental results match well with computer simulations.

Figure 6:
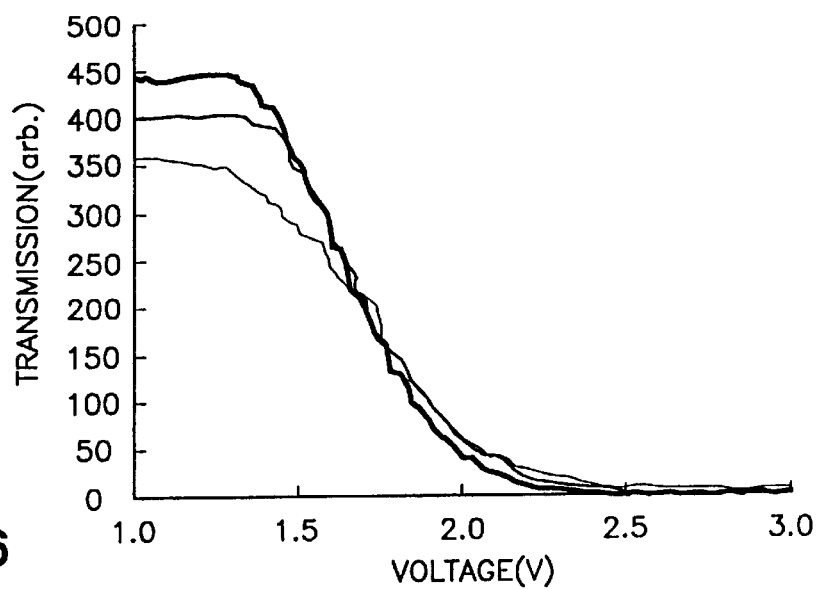
FIG. 6 is a representative graph showing transmission curves of four domain homogeneous cells constructed in accordance with the invention having different resolutions, the sizes of each domain being, at 1 volt from highest to lowest transmission, a single domain, a 300 μm domain and a 50 μm domain, respectively.

The effect of disclination lines at the boundary of the subpixels i.e., domains, on contrast was investigated by measuring the transmission curves of four domain test cells with different resolutions. The results are shown in FIG. 6, which indicates that the disclination lines decrease the transmission and the contrast, especially the transmission, in the full-off state as the resolution increases. This also shows that at resolution higher than 100 $\mu$m light blocking stripes over the disclinations are required to achieve contrast ratios greater than 220.

Figure 7A:
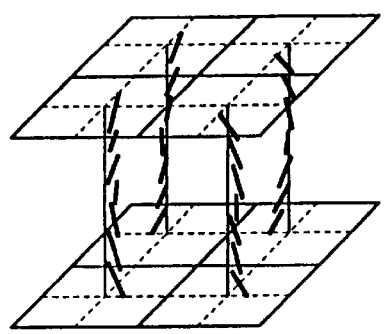
FIGS. 7A,B are perspective views of a four domain tilted homeotropic liquid crystal pixel constructed in accordance with the invention at voltage equal to 0 volts and voltage greater than $V_{th}$, respectively.
Figure 7B:
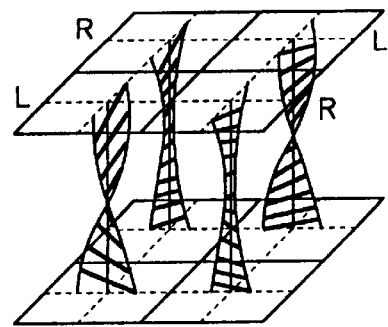

The required tilted homeotropic alignment (tilt angle ~4°) was obtained by the aforementioned method of producing four domain tilted homeotropic cells. A cell was fabricated with 5 $\mu$m spacers and two striped substrates with the stripes oriented perpendicular to each other. This produced a four-domain structure with each domain acting as an individual tilted homeotropic twisted nematic cell as shown in FIGS. 7A, B. The cell was filled with the liquid crystal mixture (43% by weight ZLI 2806+57% by weight ZLI 4330, Δn ~0.0938). Because of the very small tilt angle, the domain boundaries were not visible in the OFF state and the display was completely dark under crossed polarizers. Upon application of an electric field of sufficient strength the director in adjacent domains twisted in opposite directions as shown in FIG. 7B. This was confirmed by the directions of motion of the conoscopic cross in a sample with larger domains (4 mm$^2$). The domain size was 24×24 $\mu$m$^2$, i.e., the pixel size was 48×48 $\mu$m$^2$ such that the resolution was 500 lines/inch. Reduction in contrast due to the dark domain boundaries was very minimal because the cells were dark in the OFF state.

The director configuration in each four domain pixel has two fold symmetry about the center of the pixel. However, electro-optic characteristics have four fold symmetry. This is a great improvement over conventional liquid crystal displays.

Figure 8:
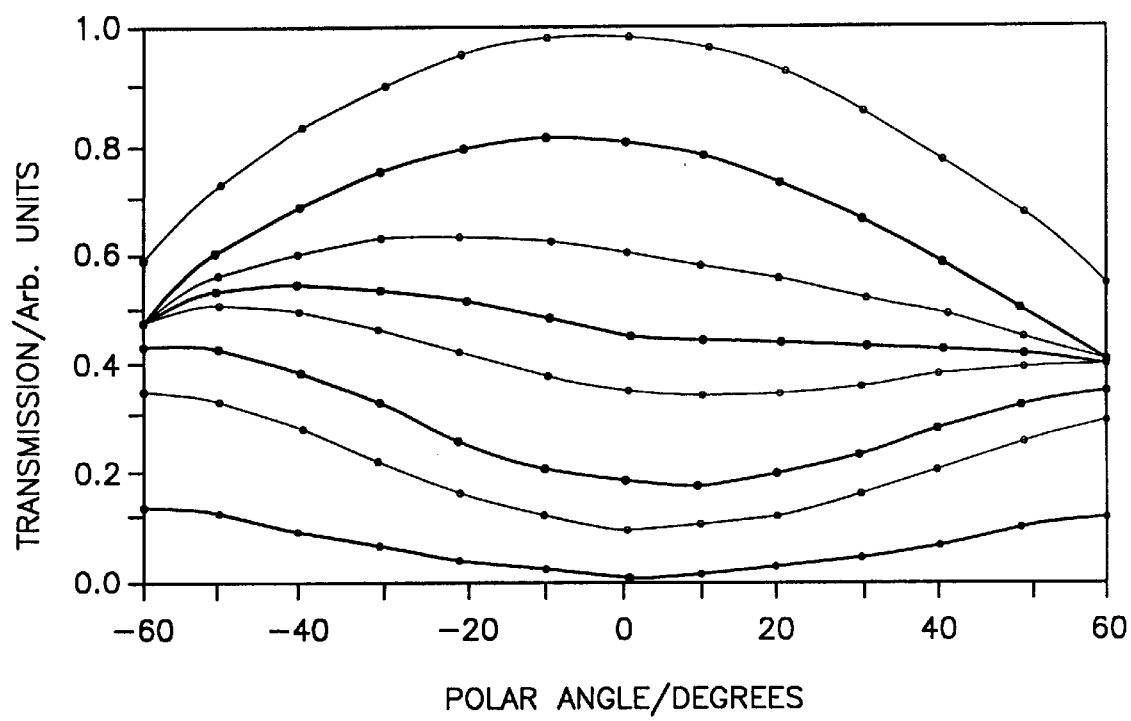
FIG. 8 is a representative graph of a four domain tilted homeotropic cell, showing the polar angle dependence of the transmission of 8 gray scales.

The polar angle dependence of transmission in eight gray levels of a four domain tilted homeotropic test cell is shown in FIG. 8. The measurement results show no gray scale inversion within ±50° at any direction.

It is important to note that to obtain wider viewing angles without gray scale reversal in both the homogeneous and tilted homeotropic embodiments, the optical path Δn.d is selected so the cell operates at Gooch-Tarry's first interference minimum condition, where Δn is the birefringence of the liquid crystal and d is the cell thickness. Decreasing the optical path below this first minimum value produces much wider viewing angles at the expense of brightness.

The aforementioned tilted homeotropic alignment technique of the invention provides a much easier and simpler technique than existing methods to obtain a four domain tilted homeotropic liquid crystalline pixel. Since the angle of $SiO_x$ deposition is not very crucial in the method of the invention, this provides the flexibility of making alignment layers for larger displays. As an example, a 10"×10" substrate easily fits into these limits at a distance of 14" from the $SiO_x$ source.

Most importantly, changing the direction of the tilt angle without damaging the alignment layer is quite easy in this method. Hence, this technique offers the possibility of making alignment layers using photolithography for other types of multi-domain displays. Also this is very useful in making high contrast light valves for projection displays.

The four domain tilted homeotropic display of the invention has the advantages of wider viewing angle with high contrast, a very dark OFF state and a bright ON state, good gray scale capability without any contrast reversal (up to ±60°) in both horizontal and vertical directions, no optical compensators and no rubbing treatment. This could be useful in direct view displays (conventional, passive and active matrix) which need a wide viewing angle, good gray scale capability and high contrast. In the four domain tilted homeotropic display of the invention it is much easier than in conventional liquid crystal displays to obtain very small domains (eg., 10 μm) without having jagged edges at the domain boundaries. This is difficult to obtain by a rubbing alignment process. Because of the low switching times for all the gray levels this could be useful in displaying standard video rate images without any difficulty.

The twisted nematic homogeneous alignment technique of the invention has advantages over the tilted homeotropic technique of the invention. The reverse rubbing aspect of the twisted nematic homogeneous alignment technique is easier from a manufacturing standpoint than the tilted homeotropic vacuum oblique evaporation technique. The twisted nematic homogeneous alignment technique also produces light modulating devices that are operable at a lower voltage and at faster switching speeds than devices produced by the tilted homeotropic technique of the invention.

What is claimed is:

1. A liquid crystalline light modulating pixel comprising first and second cell wall structures and nematic liquid crystal disposed therebetween, said first and second cell wall structures cooperating with said liquid crystal to form four polymer-stabilized liquid crystal domains within said pixel, wherein the liquid crystal in each of said domains exhibits a twisted nematic liquid crystal structure and the orientation of the liquid crystal director of the liquid crystal adjacent one of said cell wall structures in at least two domains is different in the absence of chiral additives.

2. The liquid crystalline pixel according to claim 1 wherein said liquid crystal has positive dielectric anisotropy and the liquid crystal adjacent said cell wall structures is tilted with respect thereto from 0.5°–30°.

3. The liquid crystalline pixel according to claim 1 wherein said liquid crystal has negative dielectric anisotropy and the liquid crystal adjacent said cell wall structures is tilted with respect to a normal to said cell wall structures from 0.1°–10°.

4. The liquid crystalline pixel according to claim 1 wherein the orientation of the liquid crystal director in all four domains adjacent one of said cell wall structures is different.

5. The liquid crystalline pixel according to claim 1 wherein the liquid crystal director in two domains has right hand rotation and the liquid crystal director in the remaining domains has left hand rotation.

6. A liquid crystalline light modulating pixel comprising first and second cell wall structures and nematic liquid crystal disposed therebetween, said first and second cell wall structures cooperating with said liquid crystal to form four polymer-stabilized liquid crystal domains within said pixel, wherein the liquid crystal in each of said domains exhibits a twisted nematic liquid crystal structure and the orientation of the liquid crystal director of the liquid crystal in at least two domains adjacent each of said cell wall structures is different in the absence of chiral additives.

7. The liquid crystalline pixel according to claim 6 wherein said liquid crystal has positive dielectric anisotropy and the liquid crystal adjacent said cell wall structures is tilted with respect thereto from 0.5°–30°.

8. The liquid crystalline pixel according to claim 6 wherein said liquid crystal has negative dielectric anisotropy and the liquid crystal adjacent said cell wall structures is tilted with respect to a normal to said cell wall structures from 0.1°–10°.

9. The liquid crystalline pixel according to claim 6 wherein the orientation of the liquid crystal director in all four domains adjacent one of said cell wall structures is different.

10. The liquid crystalline pixel according to claim 6 wherein the liquid crystal director of the liquid crystal in two domains adjacent one of the cell wall structures is rotated 180° about the cell wall normal with respect to the liquid crystal director in the remaining two domains adjacent said one cell wall structure.

11. The liquid crystalline pixel according to claim 6 wherein the liquid crystal director in two domains has right hand rotation and the liquid crystal director in the remaining domains has left hand rotation.

12. The liquid crystalline pixel according to claim 6 wherein at a middle plane of the pixel substantially midway between and parallel to said first and second cell wall structures the liquid crystal director in one domain is orthogonal to the liquid crystal director in two other domains.

13. The liquid crystalline pixel according to claim 6 wherein each of the cell wall structures includes a rubbed polyimide layer.

14. The liquid crystalline pixel according to claim 6 wherein each of the cell wall structures includes a layer of vacuum oblique evaporated material.

15. A liquid crystalline light modulating device including first and second cell wall structures with nematic liquid crystal disposed therebetween and means for electrically addressing the liquid crystal, the improvement comprising at least one liquid crystalline light modulating pixel comprising four polymer-stabilized liquid crystal domains within said pixel formed by cooperation of said first and second cell wall structures with said liquid crystal, wherein the liquid crystal in each of said domains exhibits a twisted nematic liquid crystal structure and the orientation of the liquid crystal director of the liquid crystal adjacent one of said cell wall structures in at least two domains is different in the absence of chiral additives.

16. The light modulating device according to claim 15 wherein said liquid crystal has positive dielectric anisotropy and the liquid crystal adjacent said cell wall structures is tilted with respect thereto from 0.5°–30°.

17. The light modulating device according to claim 15 wherein said liquid crystal has negative dielectric anisotropy and the liquid crystal adjacent said cell wall structures is tilted with respect to a normal to said cell wall structures from 0.1°–10°.

18. The light modulating device according to claim 15 wherein the orientation of the liquid crystal director in all four domains adjacent one of said cell wall structures is different.

19. The light modulating device according to claim 15 wherein the liquid crystal director in two domains has right hand rotation and the liquid crystal director in the remaining domains has left hand rotation.

20. The light modulating device according to claim 15 further comprising two polarizers between which the cell wall structures are located, wherein a polarization orientation passed by one polarizer is parallel to a polarization orientation passed by the other polarizer.

21. The light modulating device according to claim 15 further comprising two polarizers between which the cell wall structures are located, wherein a polarization orientation passed by one polarizer is orthogonal to a polarization orientation passed by the other polarizer.

22. A method of producing a four domain liquid crystalline pixel for a light modulating device comprising the steps of providing first and second cell wall structures, treating at least a first region on said cell wall structures to promote a liquid crystal orientation in one direction, treating at least a second region on said cell wall structures to promote a liquid crystal orientation in a different direction than in said first region, spacing apart the cell wall structures and providing a polymer and a nematic liquid crystal therebetween, and inducing polymerization, wherein the treatment of said first and second regions produces four polymer-stabilized domains in which the liquid crystal has twisted nematic liquid crystal structure extending between said first and second cell wall structures and the orientation of the liquid crystal director of the liquid crystal adjacent one of said cell wall structure in at least two domains is different in the absence of chiral additives.

23. The method according to claim 22 further comprising orienting the cell wall structures such that the orientation of the liquid crystal director of the liquid crystal in one domain adjacent one of the cell wall structures is orthogonal to the orientation of the liquid crystal director of the liquid crystal in said one domain adjacent the other cell wall structure.

24. The method according to claim 22 wherein the treatment of said first and second regions of said first and second cell wall structures comprises forming a layer of material on said cell wall structures, rubbing said layer in one direction, forming a mask on said layer to cover one of said first and second regions and leave the other uncovered, rubbing said layer in said first and second regions in a different direction, and removing said mask.

25. The method according to claim 24 wherein the rubbing direction of the first region is opposite to the rubbing direction of the second region.

26. The method according to claim 22 wherein the treatment of said first and second regions of said first and second cell wall structures comprises forming a first layer of material on the cell wall structures by vacuum oblique evaporation, forming a mask on said first layer to cover one of said first and second regions and leave the other uncovered, rotating the cell wall structures, forming a second layer of material on the first and second regions by vacuum oblique evaporation, and removing said mask.

27. The method according to claim 26 wherein the cell wall structures are rotated 180°.

28. A method of producing a polymer stabilized four domain liquid crystalline pixel for a light modulating device, comprising the steps of providing first and second cell wall structures, rotating the cell wall structures, depositing a first layer of liquid crystal alignment material onto the rotating cell wall structures by vacuum oblique evaporation, stopping rotation of the cell wall structures opposite to an intended pretilt orientation of a liquid crystal director of liquid crystal adjacent the cell wall structures, depositing a second layer of liquid crystal alignment material onto the fixed cell wall structures by vacuum oblique evaporation, masking the cell wall structures in an alternating striped pattern, rotating the cell wall structures a predetermined angle, depositing a third layer of liquid crystal alignment material onto the cell wall structures by vacuum oblique evaporation, removing said mask, and spacing said first and second cell wall structures apart and providing a polymer and a nematic liquid crystal therebetween and inducing polymerization in the absence of chiral additives.

29. The method according to claim 28 further comprising orienting the cell wall structures such that the striped pattern on the first cell wall structure is orthogonal to the striped pattern on the second cell wall structure.

30. The method according to claim 28 wherein the liquid crystal alignment material is $SiO_x$.

31. The method according to claim 28 wherein said predetermined angle is 180°.

32. A liquid crystalline light modulating pixel comprising first and second cell wall structures and nematic liquid crystal disposed therebetween, said first and second cell wall structures cooperating with said liquid crystal to form four liquid crystal domains within said pixel, wherein the liquid crystal in each of said domains exhibits a twisted nematic liquid crystal structure and the orientation of the liquid crystal director of the liquid crystal adjacent one of said cell wall structures in at least two domains is different in the absence of chiral additives and wherein a pretilt angle in all liquid crystal domains is the same, and wherein the first and second cell wall structures are treated to promote liquid crystal orientation.

33. The liquid crystalline pixel according to claim 32 wherein said liquid crystal has positive dielectric anisotropy and the liquid crystal adjacent said cell wall structures is tilted with respect thereto from 0.5°–30°.

34. The liquid crystalline pixel according to claim 32 wherein said liquid crystal has negative dielectric anisotropy and the liquid crystal adjacent said cell wall structures is tilted with respect to a normal to said cell wall structures from 0.1°–10°.

35. The liquid crystalline pixel according to claim 32 wherein the orientation of the liquid crystal director in all four domains adjacent one of said cell wall structures is different.

36. The liquid crystalline pixel according to claim 32 wherein the liquid crystal director in two domains has right hand rotation and the liquid crystal director in the remaining domains has left hand rotation.

37. A liquid crystalline light modulating pixel comprising first and second cell wall structures and nematic liquid crystal disposed therebetween, said first and second cell wall structures cooperating with said liquid crystal to form four liquid crystal domains within said pixel, wherein the liquid crystal in each of said domains exhibits a twisted nematic liquid crystal structure and the orientation of the liquid crystal director of the liquid crystal in at least two domains adjacent each of said cell wall structures is different in the absence of chiral additives and wherein a pretilt angle in all liquid crystal domains is the same, and wherein the first and second cell wall structures are treated to promote liquid crystal orientation.

38. The liquid crystalline pixel according to claim 37 wherein said liquid crystal has positive dielectric anisotropy and the liquid crystal adjacent said cell wall structures is tilted with respect thereto from 0.5°–30°.

39. The liquid crystalline pixel according to claim 37 wherein said liquid crystal has negative dielectric anisotropy and the liquid crystal adjacent said cell wall structures is tilted with respect to a normal to said cell wall structures from 0.1°–10°.

40. The liquid crystalline pixel according to claim 37 wherein the orientation of the liquid crystal director in all four domains adjacent one of said cell wall structures is different.

41. The liquid crystalline pixel according to claim 37 wherein the liquid crystal director of the liquid crystal in two domains adjacent one of the cell wall structures is rotated 180° about the cell wall normal with respect to the liquid crystal director in the remaining two domains adjacent said one cell wall structure.

42. The liquid crystalline pixel according to claim 37 wherein the liquid crystal director in two domains has right hand rotation and the liquid crystal director in the remaining domains has left hand rotation.

43. The liquid crystalline pixel according to claim 37 wherein at a middle plane of the pixel substantially midway between and parallel to said first and second cell wall structures the liquid crystal director in one domain is orthogonal to the liquid crystal director in two other domains.

44. The liquid crystalline pixel according to claim 37 wherein each of the cell wall structures includes a rubbed polyimide layer.

45. The liquid crystalline pixel according to claim 37 wherein each of the cell wall structures includes a layer of vacuum oblique evaporated material.

46. A liquid crystalline light modulating device including first and second cell wall structures with nematic liquid crystal disposed therebetween and means for electrically addressing the liquid crystal, the improvement comprising at least one liquid crystalline light modulating pixel comprising four liquid crystal domains within said pixel formed by cooperation of said first and second cell wall structures with said liquid crystal, wherein the liquid crystal in each of said domains exhibits a twisted nematic liquid crystal structure and the orientation of the liquid crystal director of the liquid crystal adjacent one of said cell wall structures in at least two domains is different in the absence of chiral additives and wherein a pretilt angle in all liquid crystal domains is the same, and wherein the first and second cell wall structures are treated to promote liquid crystal orientation.

47. The light modulating device according to claim 46 wherein said liquid crystal has positive dielectric anisotropy and the liquid crystal adjacent said cell wall structures is tilted with respect thereto from 0.5°–30°.

48. The light modulating device according to claim 46 wherein said liquid crystal has negative dielectric anisotropy and the liquid crystal adjacent said cell wall structures is tilted with respect to a normal to said cell wall structures from 0.1°–10°.

49. The light modulating device according to claim 46 wherein the orientation of the liquid crystal director in all four domains adjacent one of said cell wall structures is different.

50. The light modulating device according to claim 46 wherein the liquid crystal director in two domains has right hand rotation and the liquid crystal director in the remaining domains has left hand rotation.

51. The light modulating device according to claim 46 further comprising two polarizers between which the cell wall structures are located, wherein a polarization orientation passed by one polarizer is parallel to a polarization orientation passed by the other polarizer.

52. The light modulating device according to claim 46 further comprising two polarizers between which the cell wall structures are located, wherein a polarization orientation passed by one polarizer is orthogonal to a polarization orientation passed by the other polarizer.

53. A method of producing a four domain liquid crystalline pixel for a light modulating device, comprising the steps of
providing first and second cell wall structures,
treating at least a first region on said cell wall structures to promote a liquid crystal orientation in one direction,
treating at least a second region on said cell wall structures to promote a liquid crystal orientation in a different direction than in said first region,
spacing apart the cell wall structures and providing a nematic liquid crystal therebetween,
wherein the treatment of said first and second regions produces four domains in which the liquid crystal has a twisted nematic liquid crystal structure extending between said first and second cell wall structures and the orientation of the liquid crystal director of the liquid crystal adjacent one of said cell wall structures in at least two domains is different in the absence of chiral additives and wherein a pretilt angle in all liquid crystal domains is the same.

54. The method according to claim 53 further comprising orienting the cell wall structures such that the orientation of the liquid crystal director of the liquid crystal in one domain adjacent one of the cell wall structures is orthogonal to the orientation of the liquid crystal director of the liquid crystal in said one domain adjacent the other cell wall structure.

55. The method according to claim 53 wherein the treatment of said first and second regions of said first and second cell wall structures comprises forming a layer of material on said cell wall structures, rubbing said layer in one direction, forming a mask on said layer to cover one of said first and second regions and leave the other uncovered, rubbing said layer in said first and second regions in a different direction, and removing said mask.

56. The method according to claim 53 wherein the rubbing direction of the first region is opposite to the rubbing direction of the second region.

57. The method according to claim 53 wherein the treatment of said first and second regions of said first and second cell wall structures comprises forming a first layer of material on the cell wall structures by vacuum oblique evaporation, forming a mask on said first layer to cover one of said first and second regions and leave the other uncovered, rotating the cell wall structures, forming a second layer of material on the first and second regions by vacuum oblique evaporation, and removing said mask.

58. The method according to claim 57 wherein the cell wall structures are rotated 180°.

59. A method of producing a four domain liquid crystalline pixel for a light modulating device, comprising the steps of
providing first and second cell wall structures,
rotating the cell wall structures,
depositing a first layer of liquid crystal alignment material onto the rotating cell wall structures by vacuum oblique evaporation, stopping rotation of the cell wall structures opposite to an intended pretilt orientation of a liquid crystal director of liquid crystal adjacent the cell wall structures, depositing a second layer of liquid crystal alignment material onto the fixed cell wall structures by vacuum oblique evaporation, masking the cell wall structures in an alternating striped pattern, rotating the cell wall structures a predetermined angle, depositing a third layer of liquid crystal alignment material onto the cell wall structures by vacuum oblique evaporation, removing said mask, and spacing said first and second cell wall structures apart and providing a nematic liquid crystal therebetween in the absence of chiral additives and wherein a pretilt angle in all liquid crystal domains is the same.

60. The method according to claim 59 further comprising orienting the cell wall structures such that the striped pattern on the first cell wall structure is orthogonal to the striped pattern on the second cell wall structure.

61. The method according to claim 59 wherein the liquid crystal alignment material is $SiO_x$.

62. The method according to claim 59 wherein said predetermined angle is 180°.

* * * * *